United States Patent
Lee et al.

(10) Patent No.: US 12,472,621 B2
(45) Date of Patent: Nov. 18, 2025

(54) TEACHING METHOD, PROGRAM STORED IN THE MEDIUM FOR EXECUTING THE TEACHING METHOD AND TRANSFER SYSTEM

(71) Applicant: SEMES CO., LTD., Cheonan-si (KR)

(72) Inventors: Jong Min Lee, Yongin-si (KR); Kwang Sup Kim, Anyang-si (KR); Myeong Jun Lim, Hwaseong-si (KR); Young Ho Park, Incheon (KR); Yeon Chul Song, Seoul (KR); Sang Hyun Son, Busan (KR); Jun Ho Oh, Hwaseong-si (KR); Ji Hoon Yoo, Hwaseong-si (KR); Joong Chol Shin, Hwaseong-si (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 225 days.

(21) Appl. No.: 18/180,410

(22) Filed: Mar. 8, 2023

(65) Prior Publication Data
US 2024/0139934 A1      May 2, 2024

(30) Foreign Application Priority Data

Oct. 27, 2022   (KR) .................. 10-2022-0140432

(51) Int. Cl.
*B25J 9/00*   (2006.01)
*B25J 9/04*   (2006.01)
(Continued)

(52) U.S. Cl.
CPC .......... *B25J 9/0081* (2013.01); *B25J 9/1697* (2013.01); *B25J 11/0095* (2013.01); *B25J 19/021* (2013.01)

(58) Field of Classification Search
CPC .... B25J 9/0081; B25J 9/1697; B25J 11/0095; B25J 19/021; B25J 19/02; B25J 9/1664;
(Continued)

(56) References Cited

U.S. PATENT DOCUMENTS

| 2008/0102200 A1* | 5/2008 | Doki | H01L 21/67259 118/712 |
| 2011/0190927 A1* | 8/2011 | Douki | H01L 21/67265 414/222.01 |

(Continued)

FOREIGN PATENT DOCUMENTS

| KR | 20-1997-0011213 | 3/1997 |
| KR | 10-2005-0023424 A | 3/2005 |

(Continued)

OTHER PUBLICATIONS

Korean Office Action dated Apr. 17, 2024 issued in corresponding Korean Appln. No. 10-2022-0140432.

*Primary Examiner* — Harry Y Oh
(74) *Attorney, Agent, or Firm* — Harness, Dickey & Pierce, P.L.C.

(57) ABSTRACT

The inventive concept provides a teaching method for teaching a transfer position of a transfer robot. The teaching method includes: searching for an object on which a target object to be transferred by the transfer robot is placed, based on a 3D position information acquired by a first sensor; and acquiring coordinates of a second direction and coordinates of a third direction of the object based on a data acquired from a second sensor which is a different type from the first sensor.

11 Claims, 15 Drawing Sheets

(51) Int. Cl.
  *B25J 9/16*      (2006.01)
  *B25J 11/00*     (2006.01)
  *B25J 13/08*     (2006.01)
  *B25J 19/02*     (2006.01)
  *B25J 19/04*     (2006.01)
  *G01B 11/02*     (2006.01)
  *G01B 17/08*     (2006.01)
  *G05B 19/42*     (2006.01)
  *H01L 21/677*    (2006.01)
  *H01L 21/68*     (2006.01)

(58) Field of Classification Search
  CPC ... B25J 9/1694; B25J 9/04; B25J 13/08; B25J 15/0014; G05B 2219/40301; G05B 19/42; H01L 21/681; H01L 21/67259; H01L 21/67742; H01L 21/67745; H01L 21/67766; H01L 21/67778; H01L 21/6875; G01B 11/026; G01S 17/08
  See application file for complete search history.

(56) References Cited

U.S. PATENT DOCUMENTS

| | | | | |
|---|---|---|---|---|
| 2016/0020125 | A1* | 1/2016 | Kuwahara | H01L 21/67778 |
| | | | | 414/806 |
| 2021/0159664 | A1* | 5/2021 | Liu | H01S 5/02255 |
| 2022/0059383 | A1* | 2/2022 | Graciano | H01L 21/67161 |
| 2023/0009810 | A1* | 1/2023 | Okita | H01J 37/20 |

FOREIGN PATENT DOCUMENTS

| | | |
|---|---|---|
| KR | 2019-0109487 A | 9/2019 |
| KR | 102072035 B1 | 1/2020 |
| KR | 102096897 B1 | 4/2020 |
| KR | 10-2020-0075395 A | 6/2020 |
| KR | 2021-0129122 A | 10/2021 |

* cited by examiner

TEACHING METHOD, PROGRAM STORED IN THE MEDIUM FOR EXECUTING THE TEACHING METHOD AND TRANSFER SYSTEM

CROSS-REFERENCE TO RELATED APPLICATIONS

A claim for priority under 35 U.S.C. § 119 is made to Korean Patent Application No. 10-2022-0140432 filed on Oct. 27, 2022, in the Korean Intellectual Property Office, the entire contents of which are hereby incorporated by reference.

BACKGROUND

Embodiments of the inventive concept described herein relate to a teaching method, a program stored in a medium for executing the teaching method, and a transfer system.

In a substrate treating apparatus which manufactures semiconductor elements, various processes such as a photolithography process, an etching process, an ashing process, a thin film deposition process, and a cleaning process are performed on a substrate such as a wafer. In the substrate treating apparatus, the wafer is transferred within the substrate treating apparatus by a transfer robot. The transfer robot transfers the wafer to a support mechanism which supports the wafer, such as a spin chuck, a heating plate, and a support shelf provided by the substrate treating apparatus. In order for a process on the wafer to be properly performed, the transfer robot must be able to transfer the wafer to a correct position on these support mechanisms.

A teaching is performed to check and adjust a wafer transfer position (e.g., wafer transfer coordinates) of the transfer robot so that the transfer robot can load the wafer to the correct position of the support mechanism in the substrate treating apparatus. This teaching operation is performed by the user before the process on the wafer is performed, and more specifically, when the transfer robot is installed.

In general, the teaching operation is performed by manually operating the transfer robot using a control apparatus or the like. Specifically, the user manually operates the transfer robot to load the wafer onto the support mechanism, and at this time, the transfer coordinates of the wafer are checked. However, this method differs in a precision of the teaching operation according to a user's proficiency and fatigue, and there is a problem that the task takes a long time.

To compensate for this problem, a method of installing a vision sensor such as a camera on a transfer robot and attaching a marker such as a QR mark to a teaching position may be used. In this case, the user manually manipulates the transfer robot and roughly transfers the wafer to the transfer position, and if the vision sensor installed on the transfer robot recognizes the QR mark, the transfer coordinates of the wafer are checked based on a position information recognizing the QR mark. However, even if the vision sensor is installed on the transfer robot, there is a limit to shortening the operation time because the user must manually operate the transfer robot in order to perform the teaching operation. In addition, in the case of the vision sensor, the coordinates of the two axes of the QR Mark can be checked, but the coordinates of the three axes are difficult to check. For example, if the supporting mechanism is positioned in a front of the vision sensor, the coordinate values of i) a left-right axis and ii) an up-down axis can be checked from an image captured by the vision sensor, but the coordinate values of a front-rear axis, which is a distance from the vision sensor to the supporting mechanism, are difficult. In order to store the coordinate values of the front and rear axes in the transfer robot, the operator needs to directly input a design information (e.g., a distance value from the transfer robot to the support mechanism) or do a follow-up refinement work with the help of a wafer-type sensor.

SUMMARY

Embodiments of the inventive concept provide a teaching method, program stored in a medium for executing the teaching method and transfer system for increasing a precision of a teaching operation.

Embodiments of the inventive concept provide a teaching method, program stored in a medium for automatically performing a teaching operation which a manual operation of a user.

Embodiments of the inventive concept provide a teaching method, program stored in a medium for executing the teaching method and transfer system for completing a teaching operation without a follow-up operation using a wafer-type sensor and the like.

The technical objectives of the inventive concept are not limited to the above-mentioned ones, and the other unmentioned technical objects will become apparent to those skilled in the art from the following description.

The inventive concept provides a teaching method for teaching a transfer position of a transfer robot. The teaching method includes searching for an object on which a target object to be transferred by the transfer robot is placed, based on a 3D position information acquired by a first sensor; and acquiring coordinates of a second direction and coordinates of a third direction of the object based on a data acquired from a second sensor which is a different type from the first sensor.

In an embodiment, the teaching method further includes deriving coordinates of a first direction of the object, based on a data acquired from a third sensor which is a different from the first sensor and the second sensor.

In an embodiment, the teaching method further includes calculating teaching coordinates which are coordinates of the transfer position based on coordinates of the object including the first direction, coordinates of the second direction and coordinates of the third direction and a pre-stored information of the object.

In an embodiment, the information of the object includes a distance value from the object coordinates to the teaching coordinates.

In an embodiment, the distance value includes a distance value of the first direction, a distance value of the second direction, and a distance value of the third direction.

In an embodiment, the first sensor is a lidar sensor, the second sensor is a vision sensor, and the third sensor is a distance sensor.

In an embodiment, the teaching method further includes: deriving coordinates of the object based on the 3D position information acquired by the first sensor; and checking whether a difference between coordinates of the object derived by the first sensor and coordinates of the first, second and third directions of the object derived by the second sensor and the third sensor exceeds a threshold.

In an embodiment, if the object is a storing mechanism for storing the target object to be transferred, the object coordinates are coordinates of a specific point in a face of the object facing the transfer robot.

In an embodiment, if the object is a support unit on which the target object to be transferred is placed, the object coordinates are coordinates of at least one support pin among support pins of the object.

In an embodiment, the object coordinates include coordinates of a plurality of support pins, and the teaching method further comprises calculating the teaching coordinates from a plurality of coordinates of the support pins.

In an embodiment, if the object includes a support unit on which the target object to be transferred is placed, and a teaching jig placed on the support unit, the object coordinates are coordinates of at least one teaching pin among teaching pins of the teaching jig.

In an embodiment, the object coordinates include coordinates of a plurality of teaching pins, and the teaching method further comprises calculating the teaching coordinates from a plurality of coordinates of the teaching pins.

The inventive concept provides a program stored at a medium for executing the teaching method.

The inventive concept provides a transfer system for transferring a substrate. The transfer system includes a transfer robot for transferring the substrate; and a controller configured to control an operation of the transfer robot, and wherein the transfer robot includes: a hand on which the substrate is placed; a moving assembly which moves the hand in a first direction, a second direction, and a third direction, the second direction being perpendicular to the first direction and the third direction being perpendicular to both the first direction and the second direction; a lidar sensor for acquiring a surrounding 3D position information of the transfer robot; a vision sensor for acquiring an image of an object to acquire coordinates of the second direction and the third direction of the object, the substrate transferred by the transfer robot being placed on the object; and a distance sensor for acquiring a linear distance between the transfer robot and the object.

In an embodiment, the controller controls the transfer robot to: search the object using the lidar sensor; and move the hand in a direction toward the object searched.

In an embodiment, the controller controls the transfer robot to acquire an image of the object using the vision sensor; and calculates coordinates of the first and second directions of the object based on the image acquired by the vision sensor.

In an embodiment, the controller controls the transfer robot to measure a linear distance between the object and the transfer robot by the distance sensor, and calculates coordinates in the third direction of the object based on the linear distance acquired by the distance sensor.

In an embodiment, the controller derives: coordinates of the object based on the 3D position information acquired by the lidar sensor; and checks whether a difference between coordinates of the object derived by the lidar sensor and coordinates of the first, the second and the third directions of the object derived by the vision sensor and the distance sensor exceeds a threshold.

In an embodiment, the controller calculates teaching coordinates which are coordinates of a transfer position based on the object coordinates including coordinates of the first, the second and the third directions and a pre-stored information of the object.

In an embodiment, the controller stores a distance value from the object coordinates to the teaching coordinates.

According to an embodiment of the inventive concept, a precision of a teaching operation may be increased.

According to an embodiment of the inventive concept, a teaching operation may be automatically performed without a manual operation of a user.

According to an embodiment of the inventive concept, a teaching operation may be completed using a wafer-type sensor and the like without a follow-up operation.

According to an embodiment of the inventive concept,

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
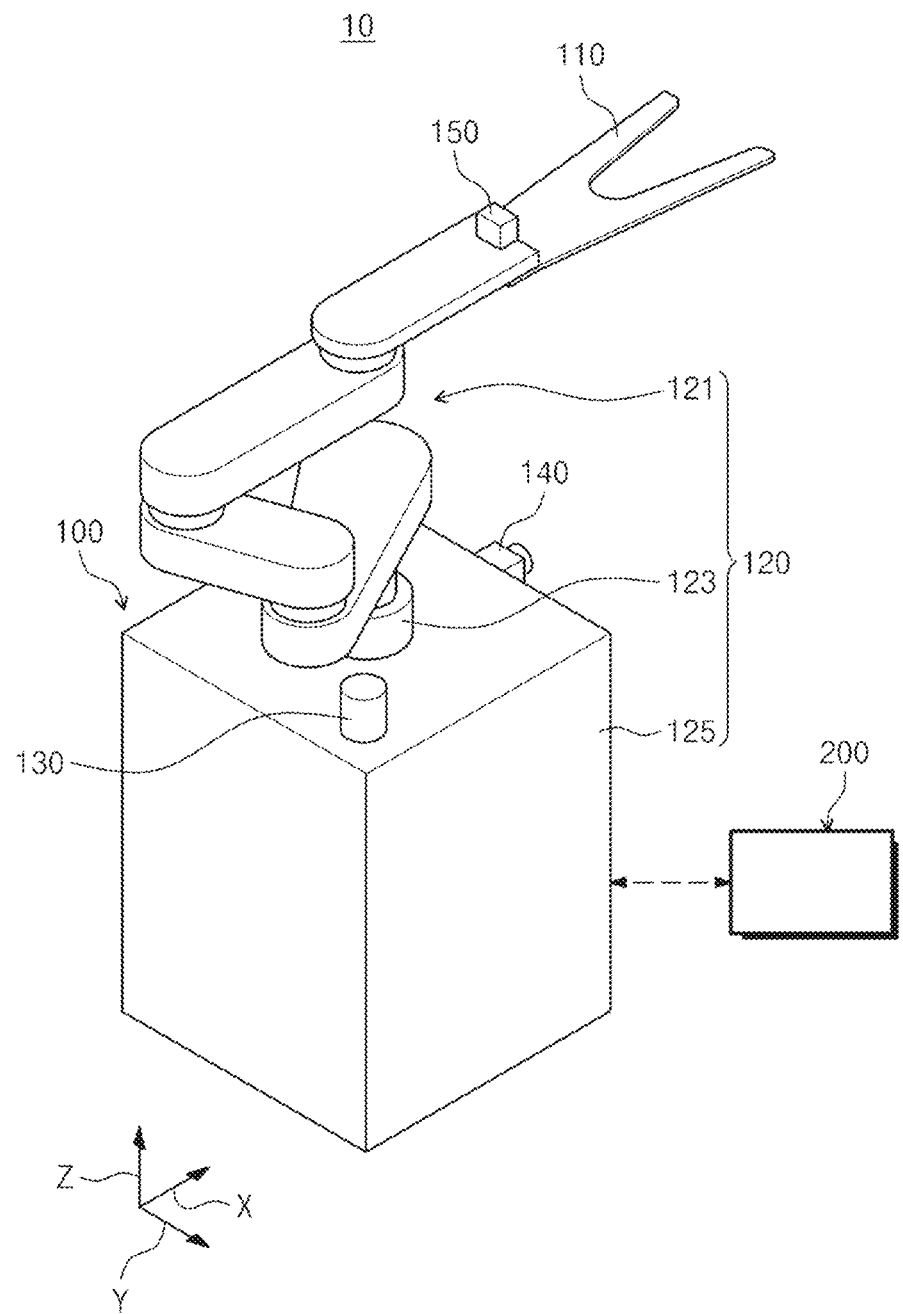
FIG. 1 schematically illustrates a transfer system according to an embodiment of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

In the specification, the singular forms include plural forms unless particularly mentioned. Also, the shapes or sizes of elements in a figure may be exaggerated for a clearer illustration.

Hereinafter, an embodiment of the inventive concept will be described with reference to FIG. 1 to FIG. 15.

A transfer system 10 described below may be provided to a substrate treating apparatus which performs a treating process for a substrate such as a wafer. Alternatively, the transfer system 10 may be installed in a semiconductor manufacturing line and may be provided to a distribution apparatus that transfers the substrate such as a wafer.

FIG. 1 is a view schematically illustrating the transfer system according to an embodiment of the inventive concept. Referring to FIG. 1, the transfer system 10 may include a transfer robot 100 and a controller 200.

The transfer robot 100 may transfer an article. A target object to be transferred by the transfer robot 100 may be a substrate such as a wafer or glass. As described above, the transfer robot 100 may be provided to the substrate treating apparatus which performs a treating process for the substrate such as a wafer. For example, the transfer robot 100 may be installed in the substrate treating apparatus which performs a photolithography process, an etching process, an ashing process, a thin film deposition process, or a cleaning process to manufacture a semiconductor element. The transfer robot 100 may be installed in an index unit, a treating unit, or an interface unit of the substrate treating apparatus. Here, the index unit may be a part having a load port on which a container such as a cassette or a FOUP is placed, the treating unit may be a part having a treating chamber for treating the substrate, and the interface unit may be a part connected to an external exposure apparatus.

The transfer robot 100 may include a hand 110, a driving unit 120, a first sensor 130, a second sensor 140, and a third sensor 150.

The hand 110 may transfer the substrate such as a wafer. The hand 110 may have a shape in which a substrate may be placed. The hand 110 may have a shape having a pair of fingers.

The driving unit 120 may change a position of the hand 110. The driving unit 120 may transfer the substrate placed on the hand 110 by changing the position of the hand 110. The driving unit 120 may change the position of the hand 110 in a first direction X, a second direction Y, and/or a third direction Z. The first direction X may be a horizontal direction, the second direction Y may be a horizontal direction and a direction perpendicular to the first direction X, and the third direction Z may be a vertical direction, and may be a direction perpendicular to the first direction X and the second direction Y. The driving unit 120 may include an arm assembly 121, an lifting/lowering shaft 123, and a base 125. The arm assembly 121 may include a plurality of arms.

The arm assembly 121 may include a plurality of arms, and the arms may be rotatably coupled to each other. That is, the arm assembly 121 may be a multi-joint arm assembly. The position of the hand 110 may be changed along the first direction X and/or the second direction Y by the arms of the arm assembly 121.

The lifting/lowering shaft 123 may move the hand 110 in the third direction Z. The lifting/lowering shaft 123 may be coupled to the arm assembly 121 composed of a plurality of arms to move the arm assembly 121 in the vertical direction. In addition, among the plurality of arms, an arm directly fastened to the lifting/lowering shaft 123 may be rotatably coupled to the lifting/lowering shaft 123.

The base 125 may include a driver (not shown). The base 125 may include at least one driver. The base 125 may include a motor such as a motor capable of driving the lifting/lowering shaft 123 and/or the arm assembly 121. In addition, the base 125 may function as a body to which the arm assembly 121 and the lifting/lowering shaft 123 may be fixed.

In addition, if the transfer robot 100 is installed in the substrate treating apparatus, the transfer robot 100 may be installed in a fixed state. For example, if the transfer robot 100 is provided to a plasma apparatus which performs an etching process for the substrate, a position of the transfer robot 100 may be fixed. However, the inventive concept is not limited thereto, and if the transfer robot 100 is installed in an index unit having a load port, the base 125 may be installed to be movable in a horizontal direction along a driving rail installed in the index unit.

The first sensor 130 may acquire a position information. The first sensor 130 may acquire a 3D position information. The 3D position information may include an information on a shape of a surrounding structure of the transfer robot 100 and an information on coordinates of the surrounding structure. The first sensor 130 may be a LiDAR (Light Detection and Ranging) sensor. The first sensor 130 may measure and scan a return time by emitting millions of laser pulses per second to collect the information on the position and shape of the surrounding structure in which the transfer robot 100 is installed. The first sensor 130 may transmit a collected 3D position information on the surrounding structure to the controller 200 to be described later. The controller 200 may check which structure exists around the transfer robot 100 and what the coordinates of the structure are through the 3D position information transmitted by the first sensor 130. The first sensor 130 may be installed on the base 125. However, the inventive concept is not limited thereto, and the first sensor 130 may be installed at various positions to obtain the 3D position information of the surrounding structure of the transfer robot 100. In addition, a peripheral structure may include an object to be described later.

The second sensor 140 may acquire an image of the object. The second sensor 140 may be a vision sensor such as a camera. The second sensor 140 may be installed on the base 125. The second sensor 140 may be an area camera. The second sensor 140 may image an image of the object on which a target object to be transferred is placed and transmit the image of the object to the controller 200. The controller 200 may derive the second direction Y and third direction Z coordinates of the object from a data on the object transmitted by the second sensor 140, for example, an image data. That is, the controller 200 may acquire a 2D position information, which is the second direction Y and third direction Z coordinates of the object, from the image acquired by the second sensor 140. For example, the controller 200 may calculate and derive the second direction Y and third direction Z coordinates of a specific position of the object from the image of the object transmitted by the second sensor 140. The second sensor 140 may be installed at a position facing the object. The second sensor 140 may be installed on the base 125 and may be installed at a position facing the object.

The third sensor 150 may measure a distance between the object and the hand 110. The third sensor 150 may be installed in the arm assembly 121. The third sensor 150 may be installed on an arm directly fastened to the hand 110 among the plurality of arms of the arm assembly 121. Alternatively, the third sensor 150 may be directly installed on the hand 110, or may be installed on the base 125 if necessary to face the object. The third sensor 150 may be a distance sensor. The third sensor 150 may be an ultrasonic distance sensor or a laser distance sensor. The third sensor 150 may measure a distance between the hand 110 and the object and transmit a measured distance value to the controller 200. The controller 200 may calculate and derive the coordinates in the first direction X of a specific position of the object based on the received distance value.

The controller 200 may control the transfer robot 100. The controller 200 may include a processor capable of calculating a data, a memory which is a storage medium for storing a data transmitted by the first sensor 130, the second sensor 140, and the third sensor 150. In addition, a program for operating the transfer robot 100 may be stored in the memory. In addition, a program for performing a teaching method of the transfer robot 100 may be stored in the memory. In addition, a design information including a size of the transfer robot 100 and the substrate treating apparatus on which the transfer robot 100 is installed may be stored in the memory in advance. In addition, a design information including a size of a container such as a FOUP, which may be a storage apparatus placed in a substrate treating apparatus, may be stored in the memory. In addition, the controller 200 may include an interface apparatus capable of receiving a command, data, etc. from a user. The interface apparatus may include a keyboard, a mouse, and the like. The controller 200 may be a computer for controlling a substrate treating apparatus included in the substrate treating apparatus.

Hereinafter, a teaching method according to an embodiment of the inventive concept will be described. The teaching method described below can be applied equally or similarly to all transfer robots which require a teaching as well as the transfer robot 100 having the aforementioned multi-joint arm. Hereinafter, an object on which the substrate, which is the target object to be transferred by the transfer robot 100, is placed is referred to as the object, a coordinate on the position of the object (more specifically, a coordinate on a specific position of the object) is defined as a teaching coordinate of the transfer position. The object coordinates and teaching coordinates may mean coordinates in the first direction X, the second direction Y, and the third direction Z, with a center position of the transfer robot 100 as the origin.

Figure 2:
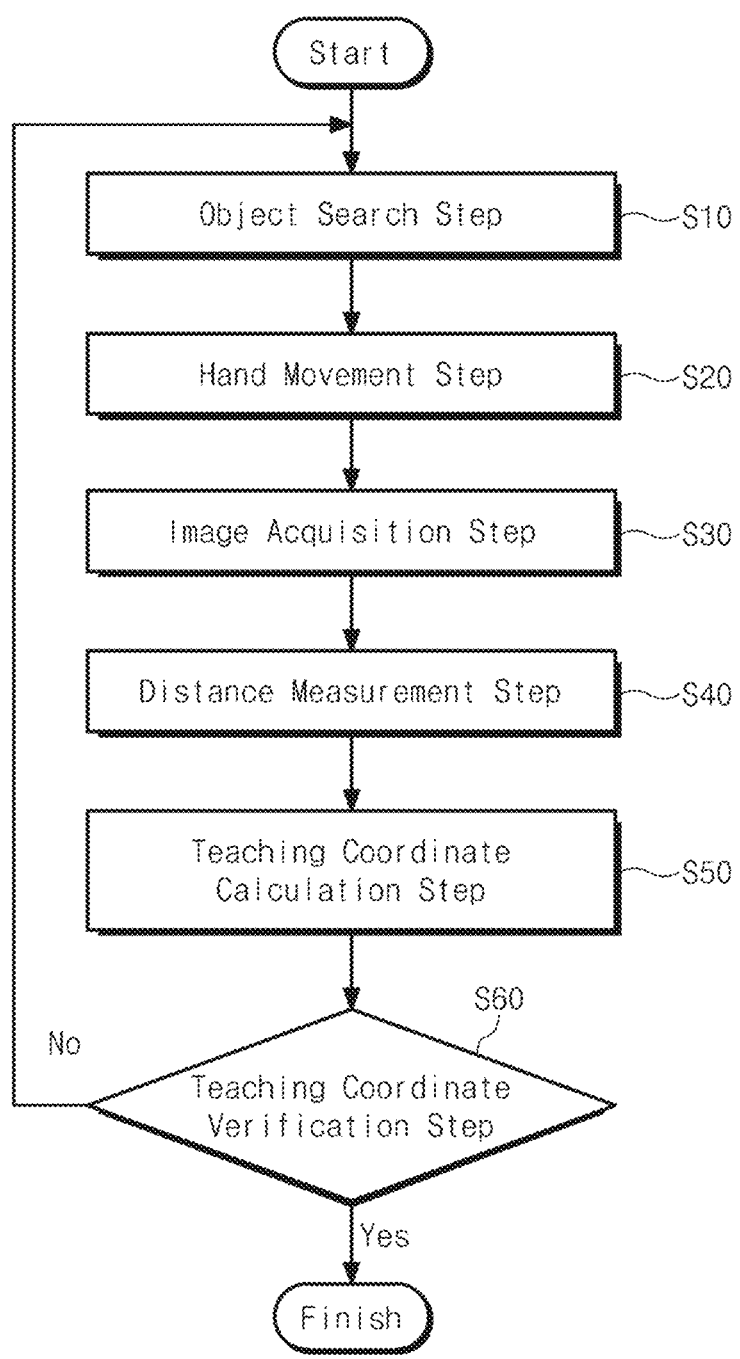
FIG. 2 is a flowchart illustrating a teaching method according to an embodiment of the inventive concept.

FIG. 2 is a flowchart illustrating a teaching method according to an embodiment of the inventive concept. Referring to FIG. 2, the teaching method according to an embodiment of the inventive concept may include an object search step S10, a hand movement step S20, an image acquisition step S30, a distance measurement step S40, a teaching coordinate calculation step S50, and a teaching coordinate verification step S60.

Figure 3:
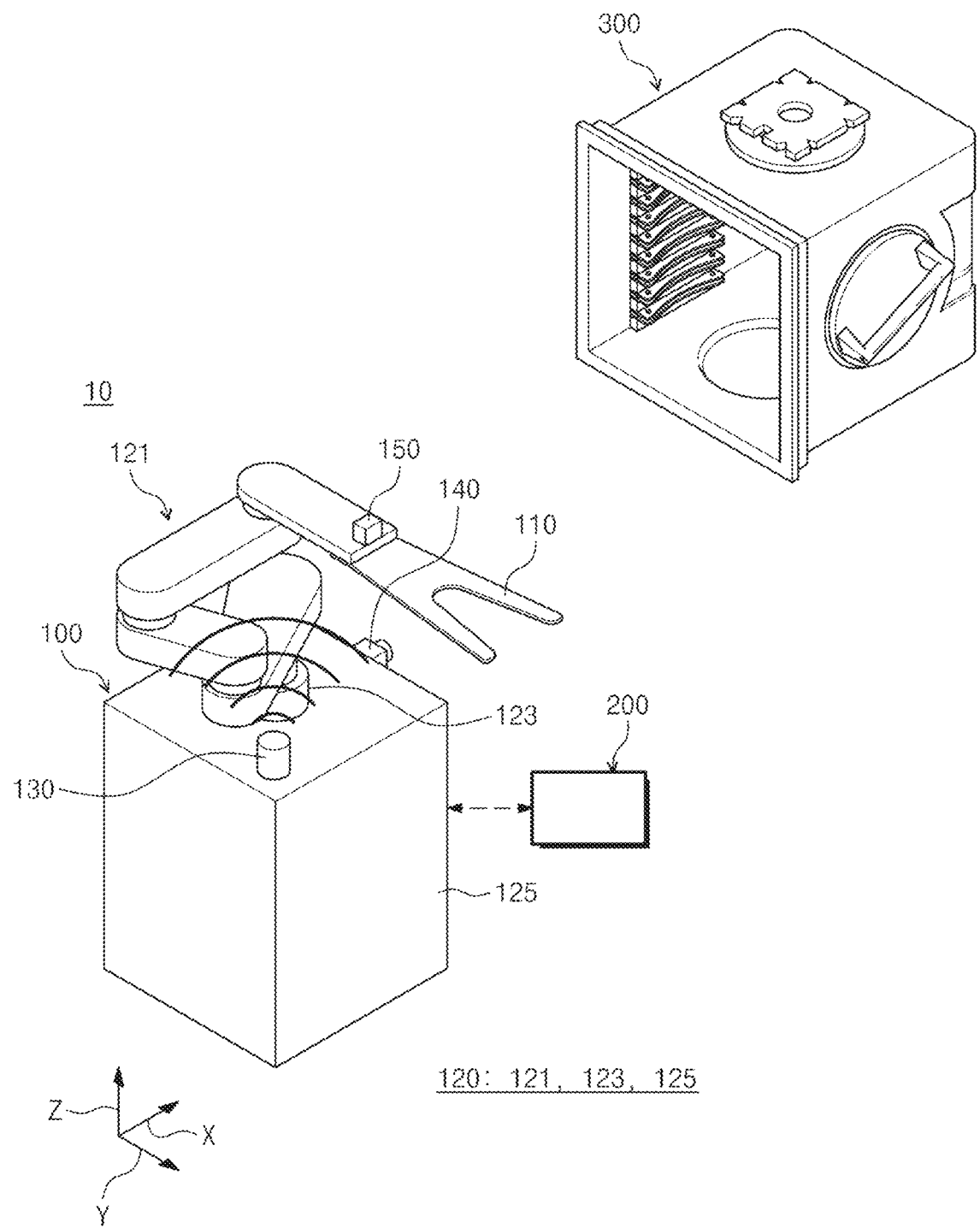
FIG. 3 illustrates the transfer system performing an object search step of FIG. 2.

The object search step S10 may be a step S10 of searching for an object on which a substrate transferred by the transfer robot 100 is placed (see FIG. 3). In the object search step S10, a first sensor 130 may acquire an information on a shape and a position of structures positioned around the transfer robot 100 and transmit the information to the controller 200. The controller 200 may determine what kind of structure is positioned around the transfer robot 100 based on a pre-memory structure shape information, and may select structures which require teaching coordinates from among the structures.

For example, a container 300, which is a storage mechanism for accommodating the substrate, such as an FOUP, may be positioned around the transfer robot 100. The first sensor 130 may transmit the information on the shape and the position of the structure around the transfer robot 100 to the controller 200. The controller 200 may select a structure requiring a teaching operation from among surrounding structures of the transfer robot 100. For example, among the surrounding structures, there may be structures which do not require a teaching work, such as an inner wall of the substrate treating apparatus or a rail, and structures that require the teaching work, such as a container 300. The controller 200 may derive approximate coordinates of a structure requiring a teaching operation.

Figure 4:
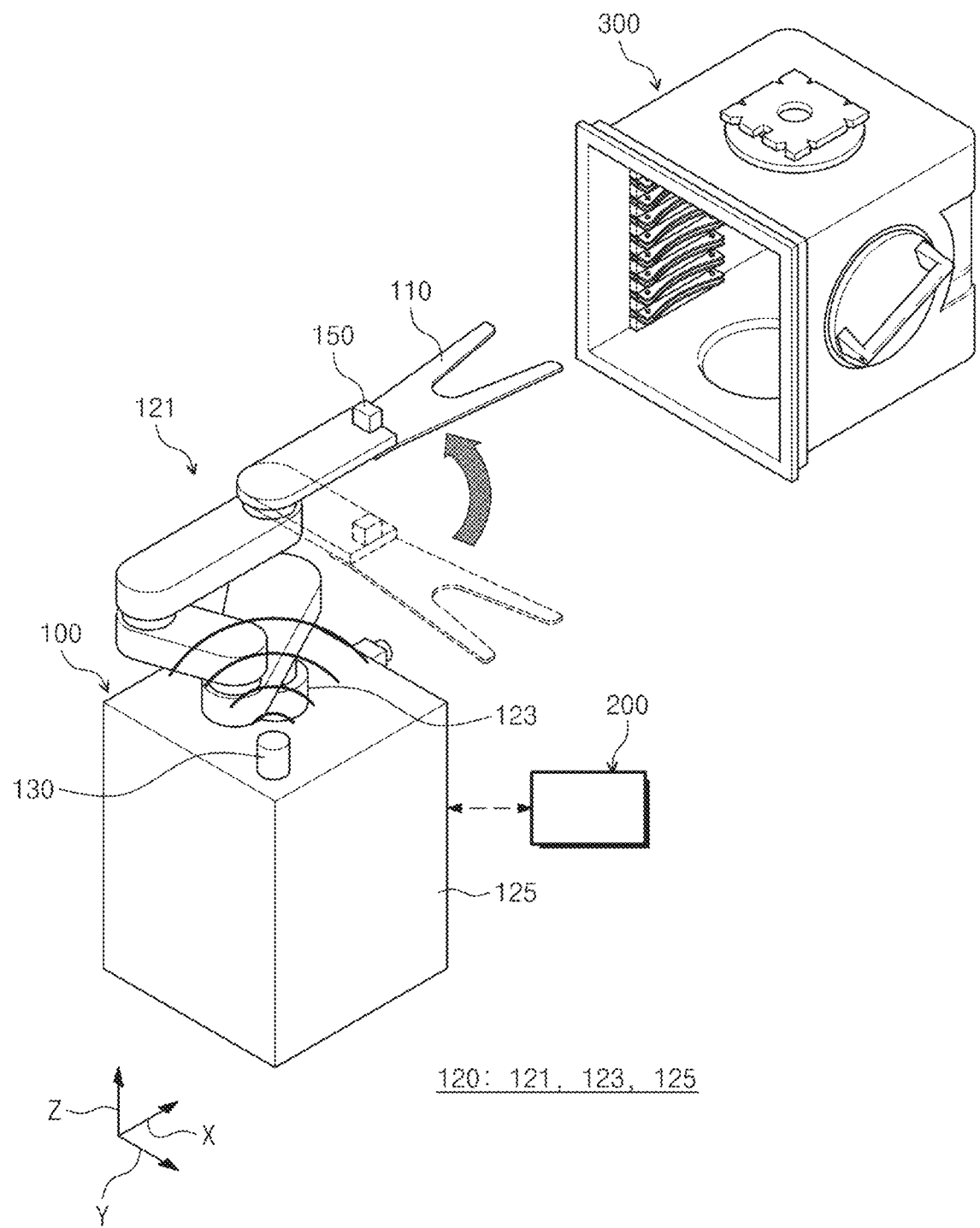
FIG. 4 illustrates the transfer system performing a hand movement step of FIG. 2.

In the hand movement step S20, the hand 110 of the transfer robot 100 may be moved in a direction toward the container 300, which may be a structure requiring a teaching operation (see FIG. 4). That is, in the hand movement step S20, the hand 110 may be moved in a direction close to the container 300 which is the object.

Figure 5:
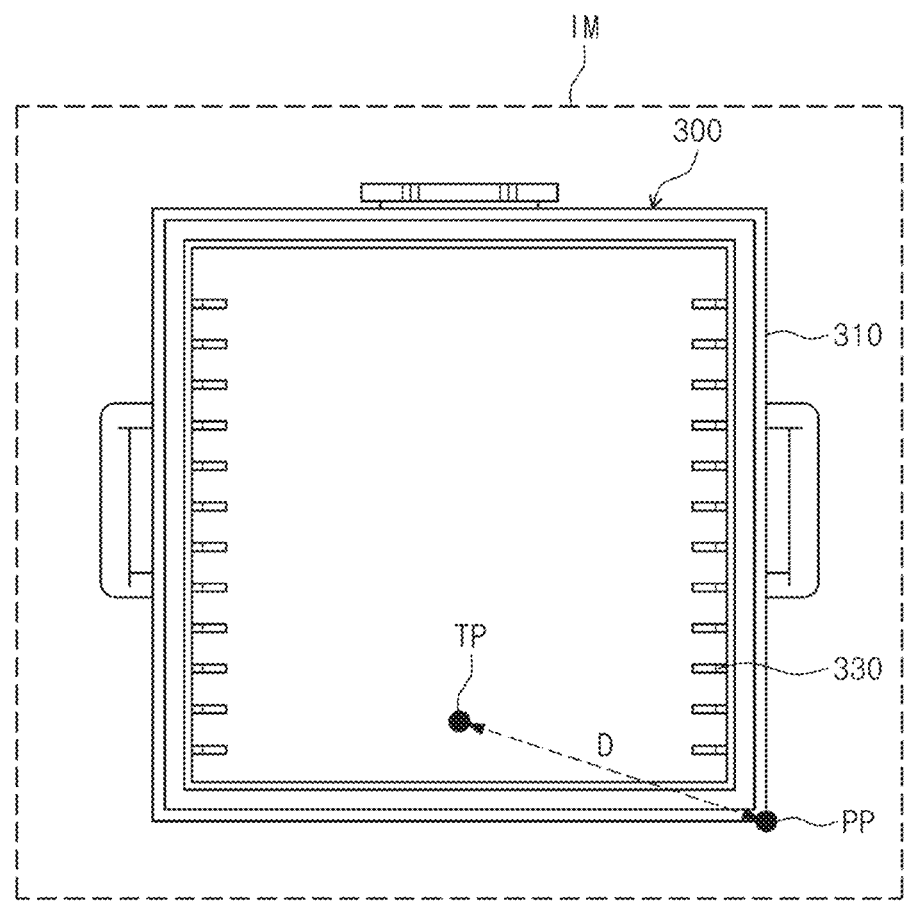
FIG. 5 illustrates an image acquisition step and an object coordinate calculation step of FIG. 2.

In the image acquisition step S30, the second sensor 140 may acquire an image IM of the object by imaging the container 300 as the object (see FIG. 5). If the controller 200 determines an approximate position of the container 300 which is the object in the object search step S10, the second sensor 140 may acquire the image IM of the container 300 by focusing on the position of the container 300 as the object. The controller 200 may calculate and derive coordinate values in the second direction Y and in the third direction Z of the container 300 from the image IM of the container 300. For example, the controller 200 may derive the coordinates of the second direction Y and the third direction Z, which are coordinates of a specific point PP belonging to the surface of the container 300 among the surfaces of the container 300 through image processing.

Figure 6:
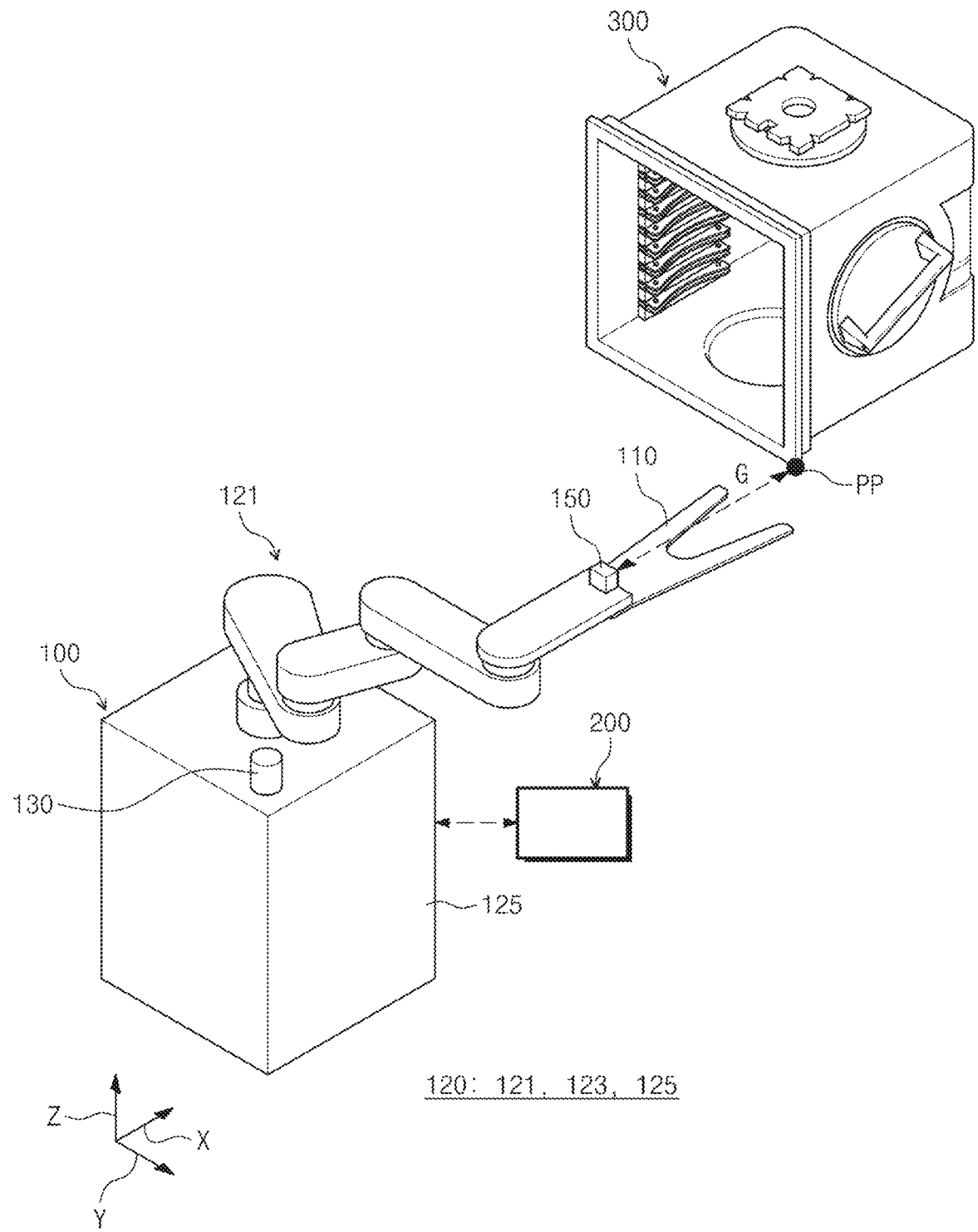
FIG. 6 illustrates the transfer system performing a distance measurement step of FIG. 2.

In the distance measuring step S40, a distance between the object and the hand 110 may be measured through the third sensor 150 (see FIG. 6). In the distance measurement step S40, the hand 110 may be moved to a position facing the specific point PP by using the coordinate value of the specific point PP obtained from the image acquisition step S30. The third sensor 150 may measure a distance between the specific point PP and the transfer robot 100. For example, the third sensor 150 may measure a distance between the hand 110 and the container 300. The controller 200 may calculate and derive the coordinates of the first direction X of a specific point PP based on the coordinates of the hand 110 when the third sensor 150 measures the distance from the container 300, and a distance between the container 300 and the hand 110 measured by the third sensor 150.

In the teaching coordinate calculation step S50, a teaching coordinate which is a coordinate of a transfer position TP may be calculated. The controller 200 may calculate teaching coordinates from the object coordinates which are coordinates of a specific point PP of the object. As described above, a design information of an object may be stored in the controller 200. The controller 200 may calculate a teaching coordinate, which is the coordinate of the transfer position TP, based on the object coordinate and the information of the container 300 which is the object stored in advance. The information stored in the controller 200 may include a distance value from the object coordinate to the teaching coordinate. The distance value may include a distance value in the first direction X, a distance value in the second direction Y, and a distance value in the third direction Z.

In the teaching coordinate verification step S60, the teaching coordinates derived in the teaching coordinate calculation step S50 may be verified. In the teaching coordinate verification step S60, the first sensor 130 may again extract a 3D position information. For example, the first sensor 130 may derive coordinates of the container 300 based on the position information of the container 300. At this time, the coordinates of the object derived by the first sensor 130 and the coordinates of the object derived by the second sensor 140 and the third sensor 150 may be compared with each other to determine whether the difference exceeds a threshold. If the difference exceeds the threshold, the above-described teaching method may be performed again.

If the first sensor 130 uses a high-performance lidar sensor, coordinates with respect to an object may be immediately and accurately derived. However, a high-performance lidar sensor can be very expensive. Accordingly, if a relatively inexpensive lidar sensor is used, it is difficult to accurately derive coordinates for the object. Accordingly, according to an embodiment of the inventive concept, an accuracy of the teaching work is improved by finding an approximate position of the object through the first sensor 130, accurately deriving the teaching coordinates through the second sensor 140 and the third sensor 150, and then verifying the teaching coordinates using the first sensor 130. In addition, since teaching coordinates can be completely derived through the second sensor 140 and the third sensor 150, the teaching work can be completed without a follow-up work using wafer-type sensors or the like.

Figure 7:
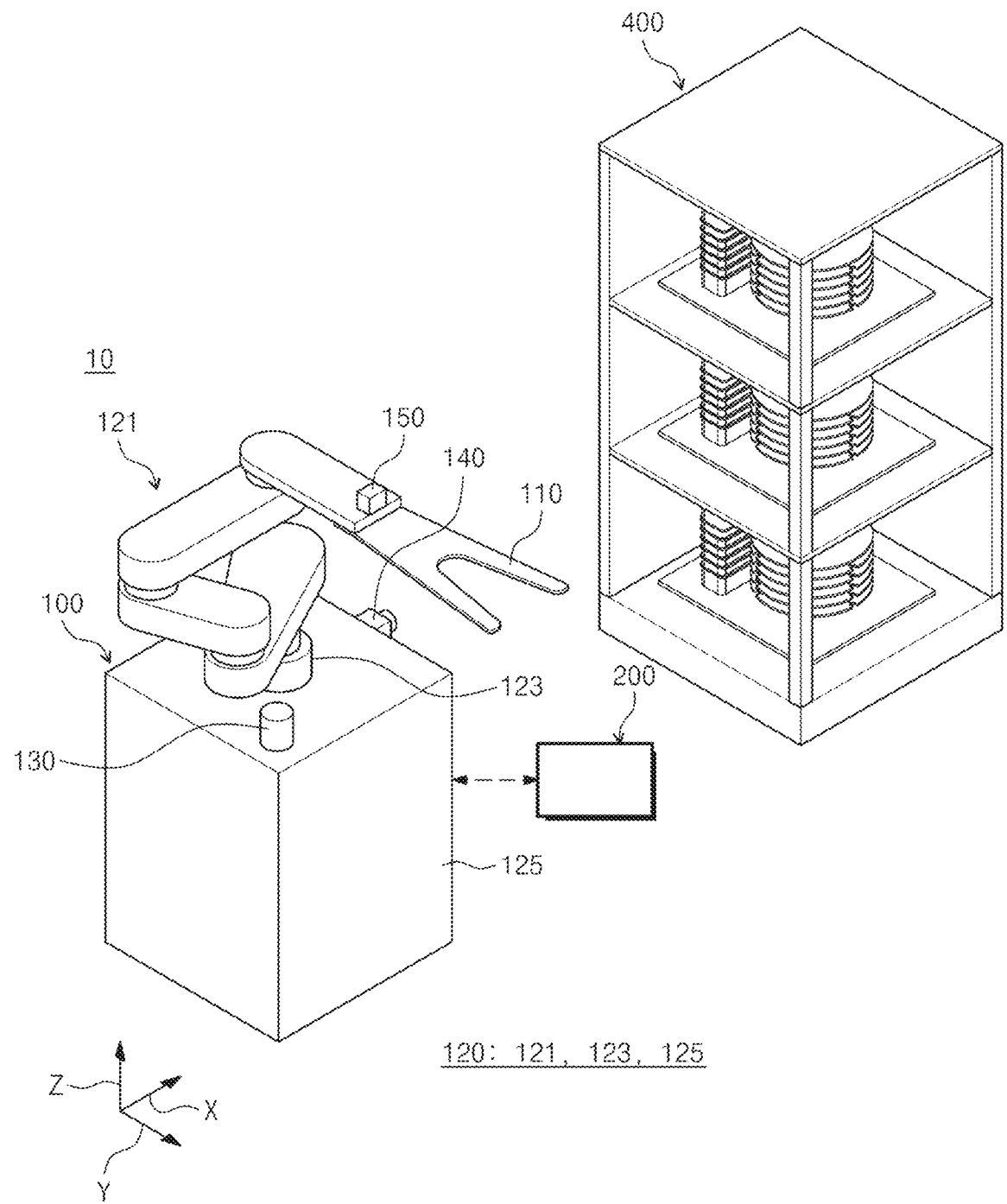
FIG. 7 illustrates another embodiment of an object on which a substrate is placed.

In the above-described example, the object is the container 300 as an example, but the inventive concept is not limited thereto. For example, as shown in FIG. 7, the object may be a buffer apparatus which is one of storage apparatuses for storing the substrate to be transferred. The buffer apparatus may include support shelves for supporting the substrate and a temperature control plate for controlling a temperature of the substrate.

Figure 8:
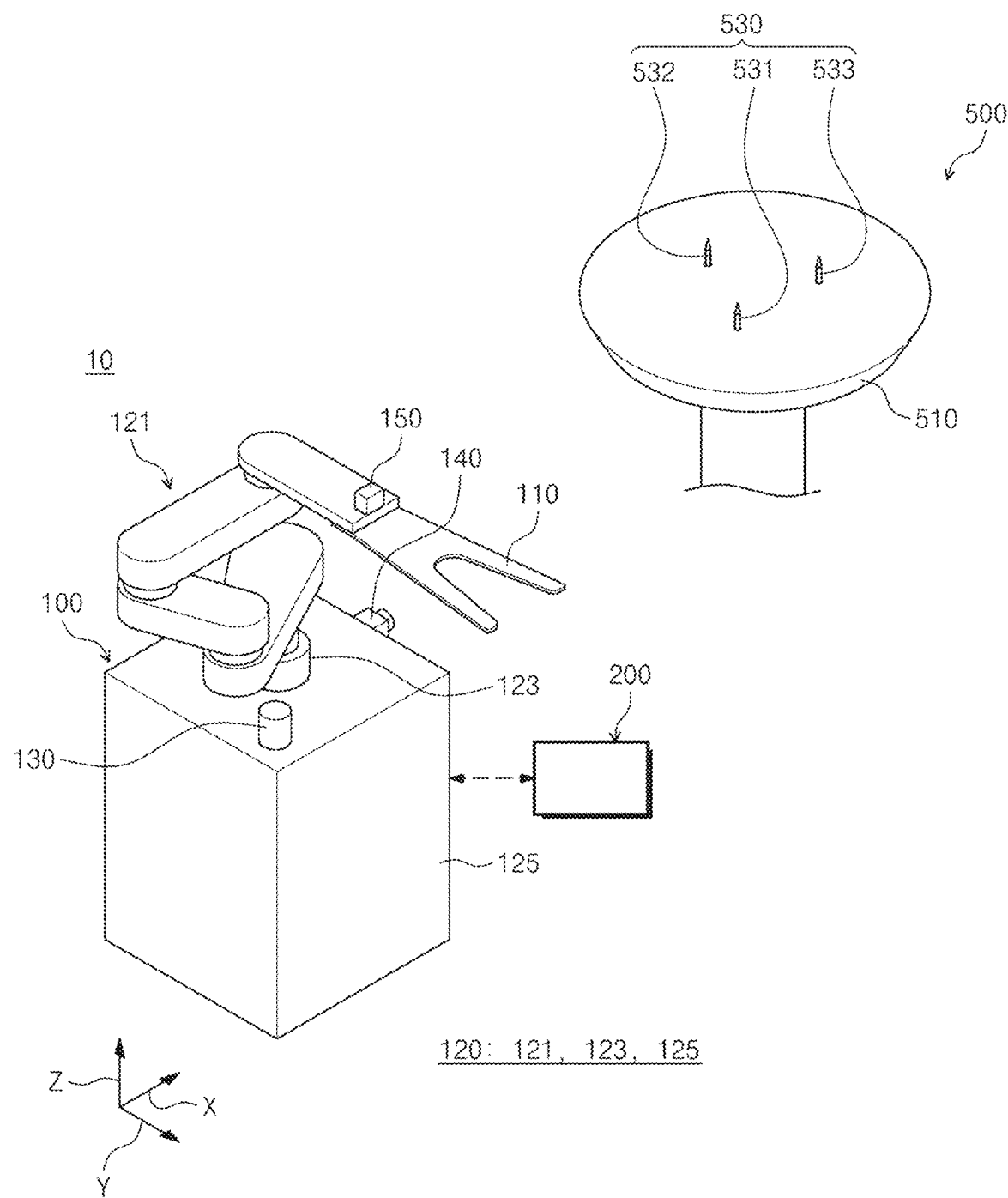
FIG. 8 illustrates another embodiment of the object on which the substrate is placed.
Figure 9:
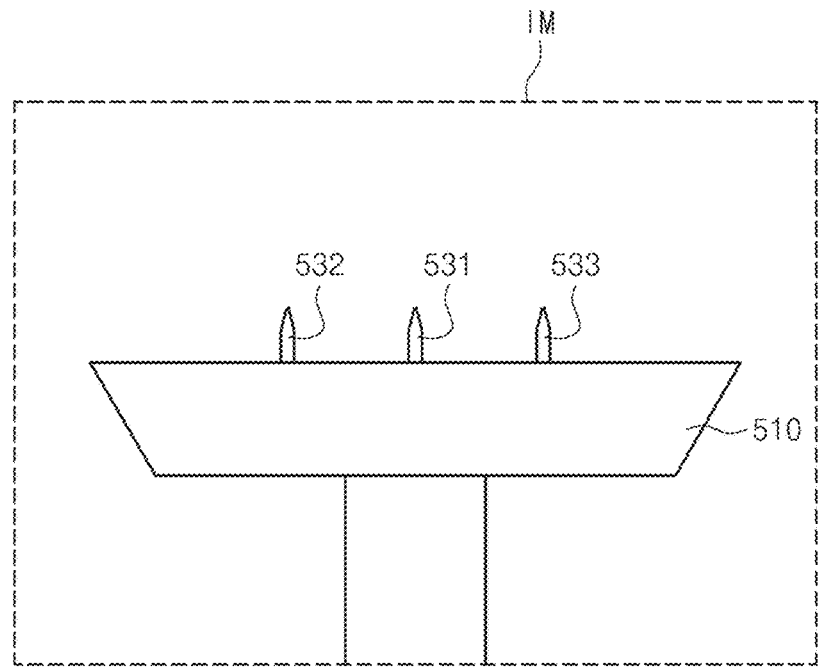
FIG. 9 illustrates an image of a spin chuck acquired by the transfer system of the inventive concept.
Figure 10:
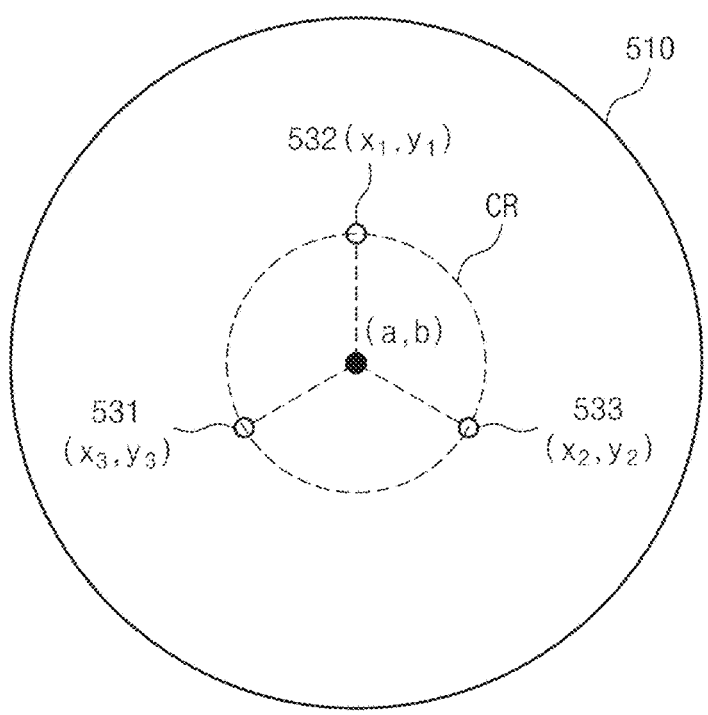
FIG. 10 illustrates a teaching coordinate calculation step from the image of the spin chuck of FIG. 9.

In the above-described example, the object is the container 300 as an example, but the inventive concept is not limited thereto. For example, as shown in FIG. 8, the object may be a spin chuck 500 which is a mechanism for supporting and rotating the substrate. The spin chuck 500 may include a chuck body 510 and a support pin 530 installed on the chuck body 510. If the object is a spin chuck 500, coordinates for a specific point of chuck body 510 can be derived similar to the above-mentioned method, and teaching coordinates can be derived through this, but teaching coordinates can be also derived using the support pin 530.

For example, if a transfer position is a center of the support pins 530 and a top height of the support pins 530, coordinates x1 in the first direction X and coordinates y1 in the second direction Y of a top end of a first support pin 531, coordinates x2 in the first direction X and coordinates y2 in the second direction Y of a top end of a second first support pin 532, coordinates x3 in the first direction X and coordinates y3 in the second direction Y of a top end of a third first support pin 533 may be derived. The controller 200 may previously store a radius value of a virtual circle CR passing through (x1, y1), (x2, y2), and (x3, y3). An equation of the circle of the virtual circle CR is as follows.

$$(x-a)^2+(y-b)^2=r^2 (a,b \text{ is a center of the circle, and } r \text{ is a radius of the circle})$$

At this time, since the coordinate values of (x1, y1), (x2, y2), and (x3, y3) are known, the values of a and b can be derived through the coordinate values of at least two of them. That is, coordinates in the first direction X and coordinates in the second direction Y may be derived from the teaching coordinates.

Figure 11:
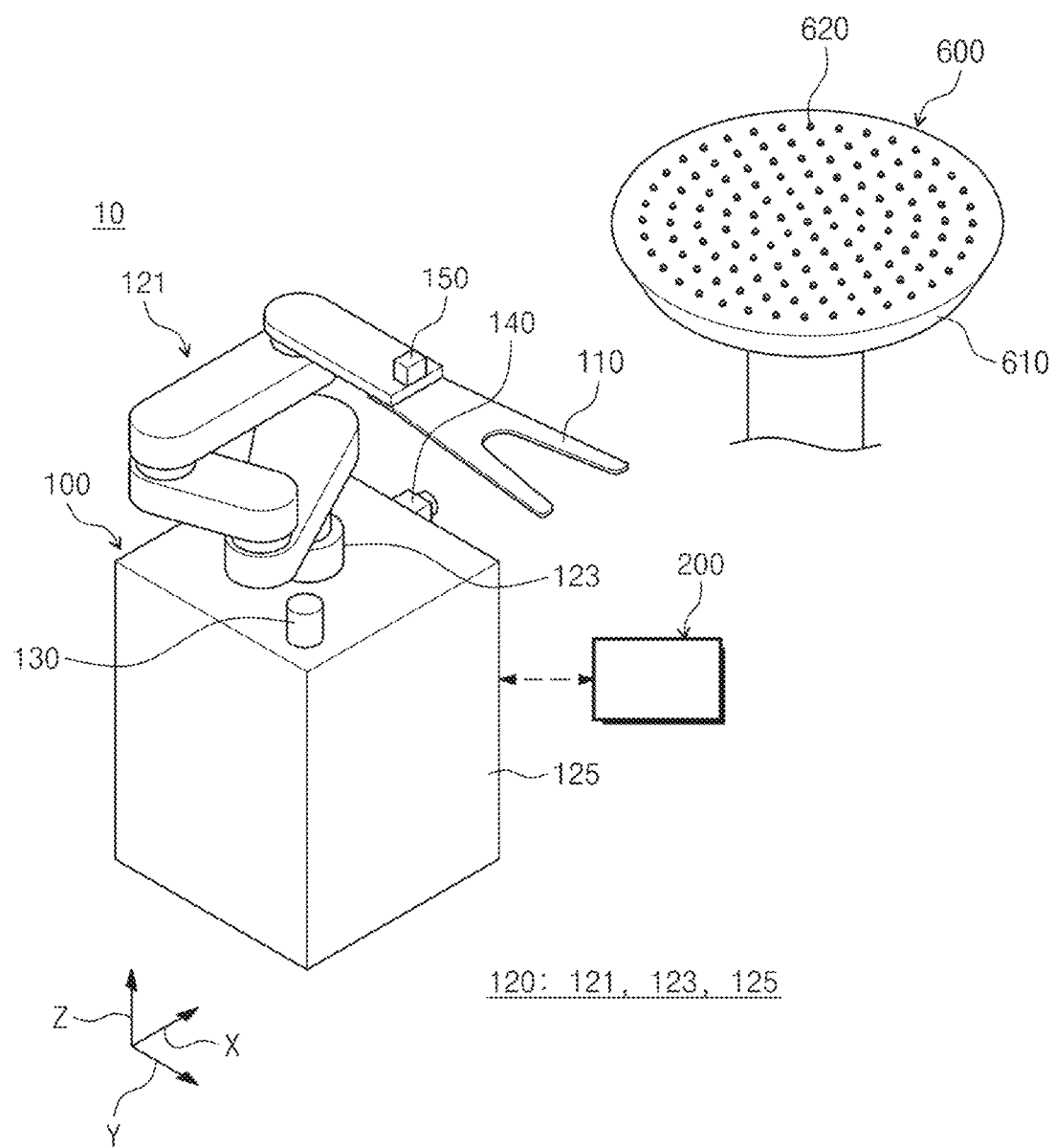
FIG. 11 illustrates another embodiment of the object on which a substrate is placed.
Figure 12:
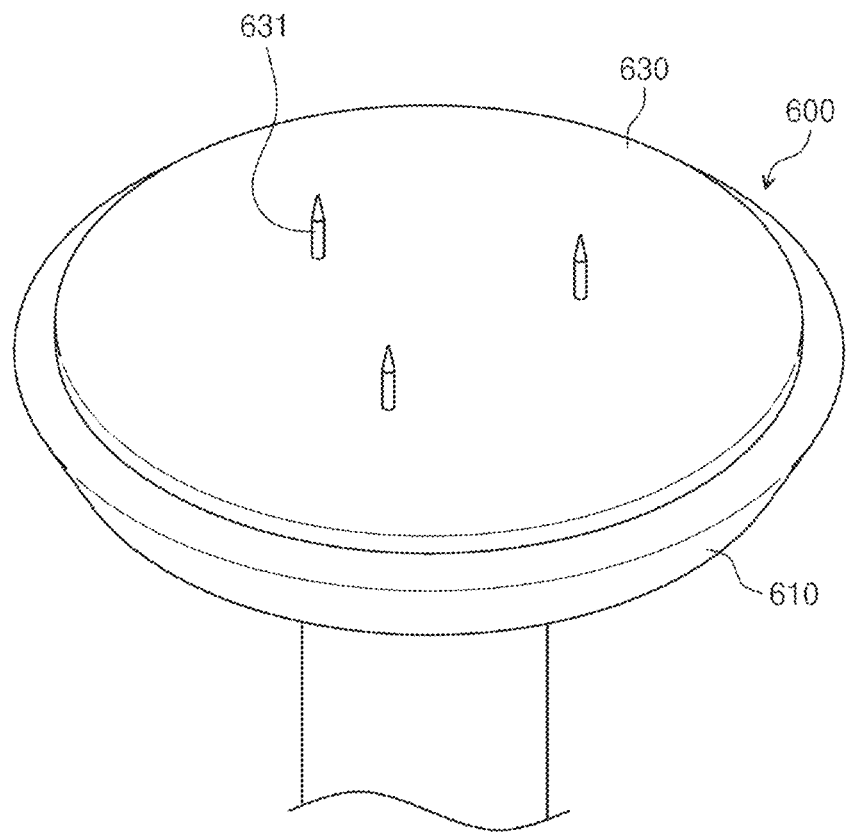
FIG. 12 illustrates a state in which a teaching jig is seated on the spin chuck of FIG. 11.

In some cases, as shown in FIG. 11, the pin 620 installed in the chuck body 610 of the chuck 600 is very short in length, making it difficult to recognize the top end of the pin 620, or in some cases, the pin 620 may not be installed in the chuck body 610. In this case, as shown in FIG. 12, it may be placed on the chuck 600, and a teaching jig 630 with a plurality of teaching pins 631 installed may be seated, and a teaching operation may be performed on the chuck 600 on which the teaching jig 630 is seated.

Figure 13:
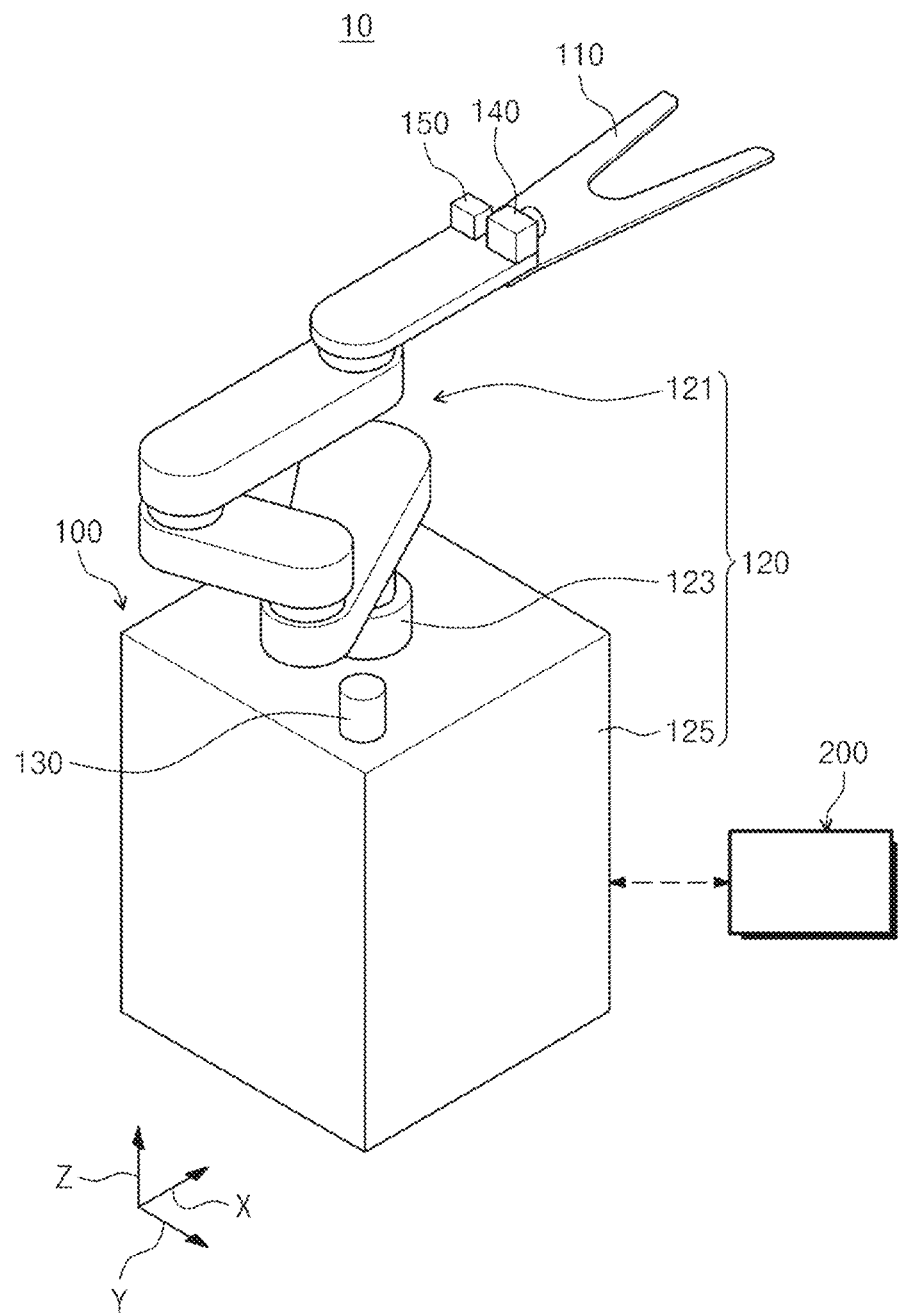
FIG. 13 schematically illustrates the transfer system according to another embodiment of the inventive concept.

In the above-described example, an example in which the second sensor 140 is installed in the base 125 has been described, but the inventive concept is not limited thereto. For example, as shown in FIG. 13, the second sensor 140 may be installed on a side of the third sensor 150 and on the arm assembly 121. In some cases, the second sensor 140 may be installed in the hand 110.

Figure 14:
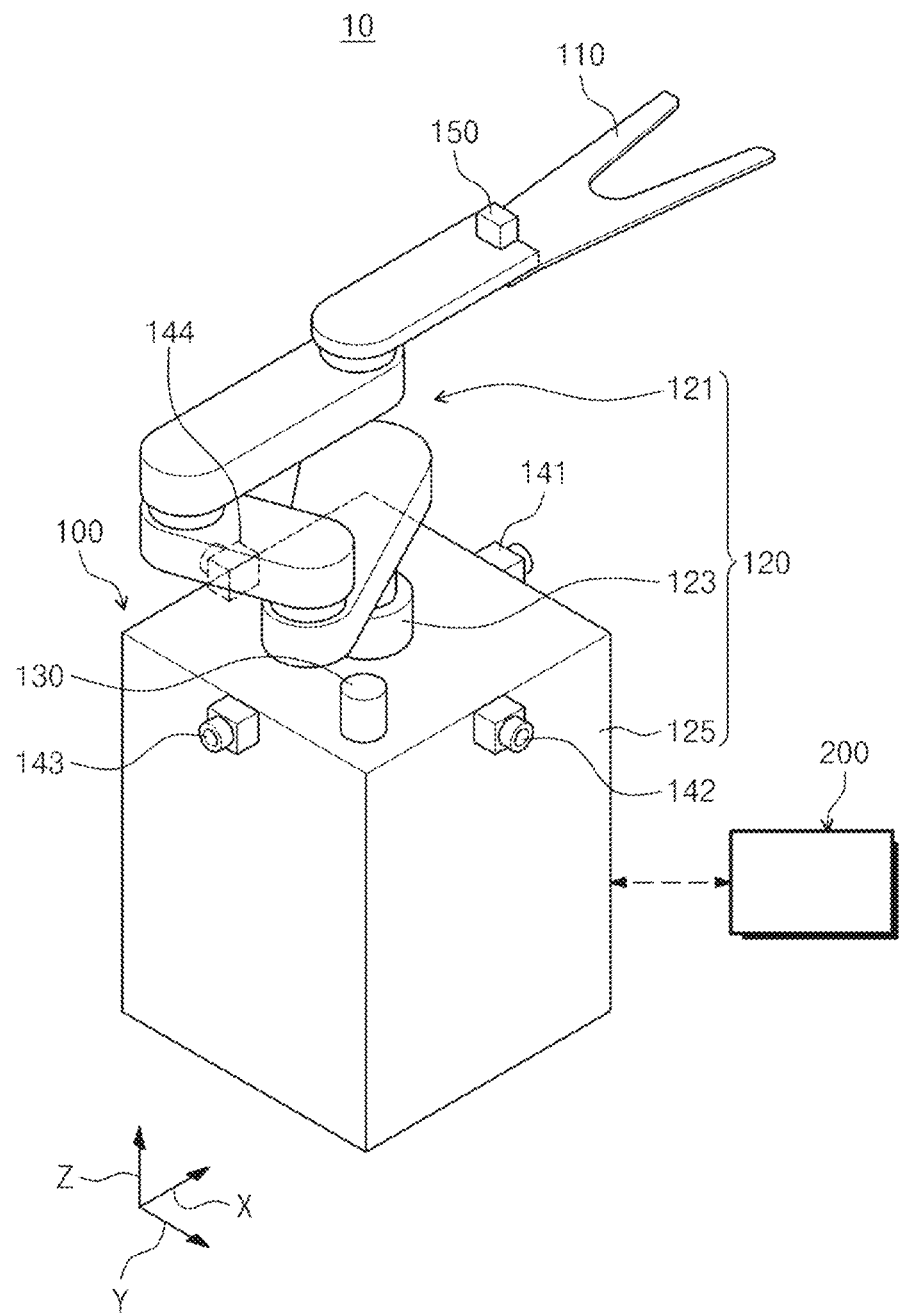
FIG. 14 schematically illustrates the transfer system according to another embodiment of the inventive concept.

In the above-described example, it has been described that only one second sensor 140 is provided, but the inventive concept is not limited thereto. For example, as shown in FIG. 14, a plurality of vision sensors 141, 142, 143, and 144 may be installed in the base 125. Each of the vision sensors 141, 142, 143, and 144 may be disposed to capture objects positioned in different directions. If the transfer robot 100 is equipped with multiple vision sensors 141, 142, 143, 144, the controller 200 may select a vision sensor to be used for imaging and image the object according to the position of the object searched in the object search step S10.

Figure 15:
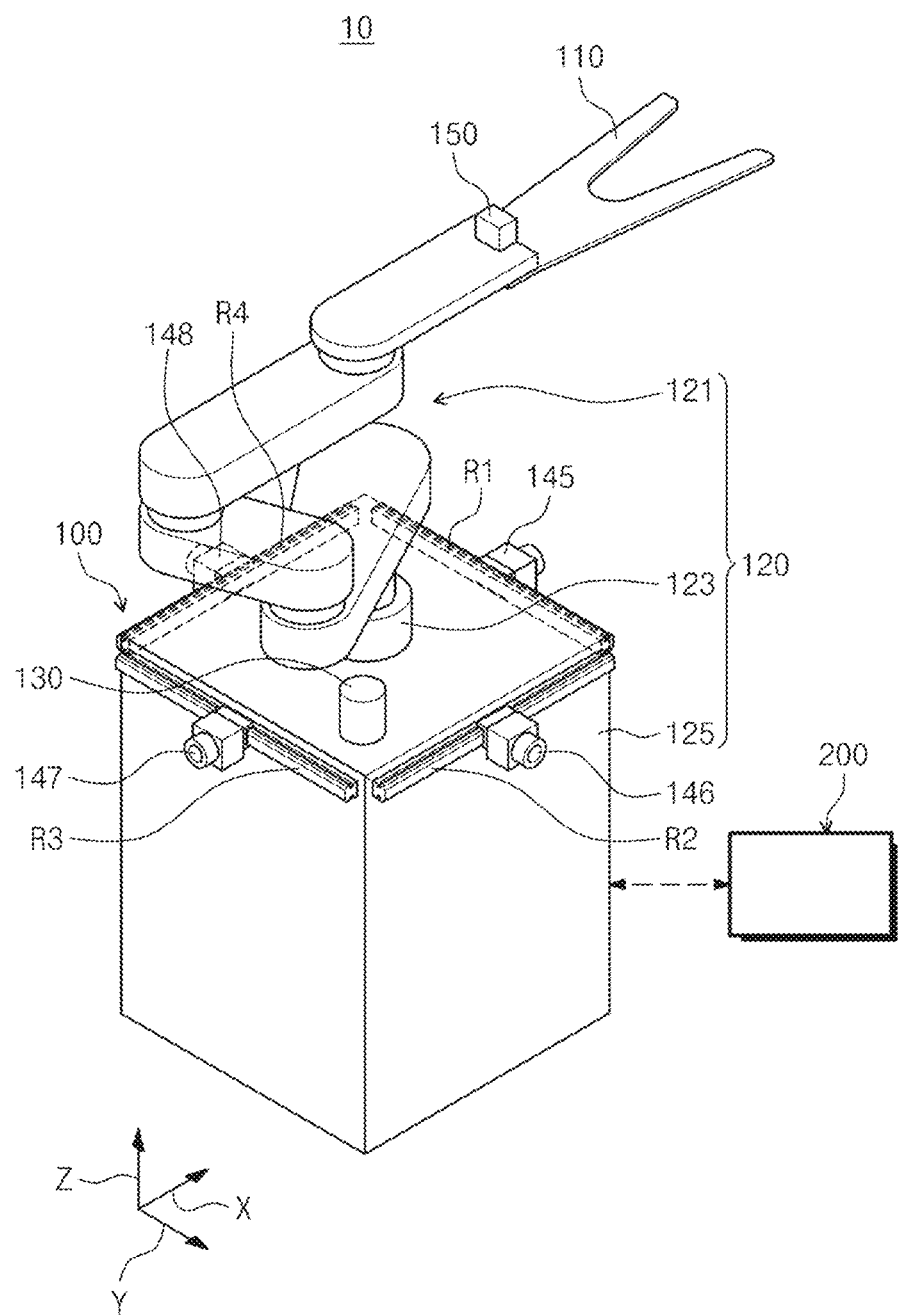
FIG. 15 schematically illustrates the transfer system according to another embodiment of the inventive concept.

In the above-described example, a fixed installation of the second sensor 140 has been described as an example, but the inventive concept is not limited thereto. For example, as shown in FIG. 15, vision sensors 141, 142, 143, and 144 may be installed on each of the moving rails R1, R2, R3, and R4 installed on the base 125 and may be configured to move in the first direction X or the second direction Y. If the transfer robot 100 is equipped with movable vision sensors 141, 142, 143, 143, and 144, the controller 200 can more effectively image the object by changing a position of the vision sensor to be used for imaging according to a position of the object searched in the object search step S10.

Figure 16:
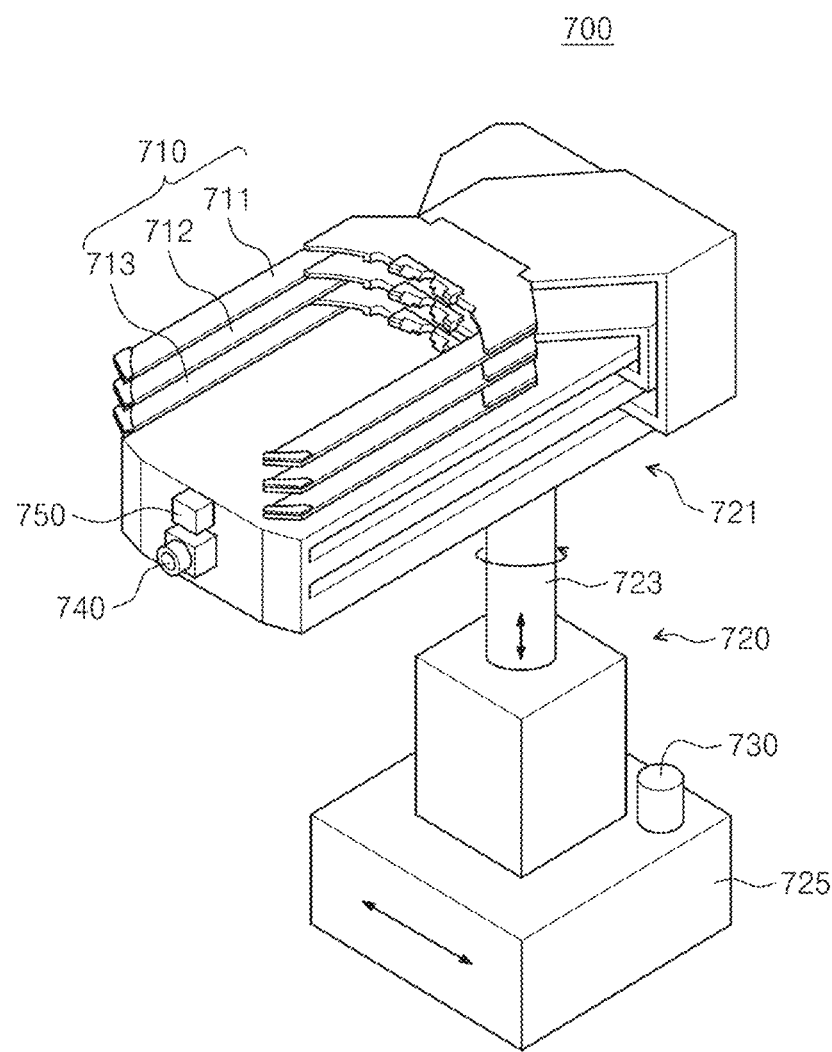
FIG. 16 schematically illustrates a transfer robot according to another embodiment of the inventive concept.

In addition, in the above-described example, the transfer robot 100 has been described as an example of a robot having a multi-joint arm, but is not limited thereto. For example, as shown in FIG. 16, the transfer robot 700 may be provided as a robot having no multi-joint arm. For example, the transfer robot 700 may include a hand 710, a driving unit 720, a lidar sensor 730, a vision sensor 740, and a distance sensor 750. The lidar sensor 730, the vision sensor 740, and the distance sensor 750 may be the same as or similar to the first sensor 130, the second sensor 140, and the third sensor 150, respectively.

The hand 710 may include a plurality of hands 711, 712, and 713. The driving unit 720 may be configured to move each of a plurality of hands 711, 712, and 713 in a front-rear direction and/or a vertical direction. For example, the driving unit 720 may include a linear assembly 721 which moves each of the hands 711, 712, 713 in the front-rear direction, a lifting/lowering shaft 723, which moves the linear assembly 721 in the vertical direction, and a base 725 which is movable along a rail which may be installed in the substrate treating apparatus and which includes the driving unit. The lidar sensor 730 may be installed on the base 725, and the vision sensor 740 and the distance sensor 750 may be installed in a front of the linear assembly 721.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A teaching method for teaching a transfer position of a transfer robot, the teaching method comprising:
    searching for an object on which a target object to be transferred by the transfer robot is placed, based on a three-dimensional (3D) position information acquired by a first sensor;
    acquiring coordinates of a first direction and coordinates of a second direction of the object based on a data acquired from a second sensor, which is a different type from the first sensor;
    deriving coordinates of a third direction of the object, based on a data acquired from a third sensor, which is a different type of sensor from the first sensor and the second sensor; and
    calculating teaching coordinates, which are coordinates of the transfer position, based on coordinates of the object including the first direction, coordinates of the second direction and coordinates of the third direction and a pre-stored information of the object,
    wherein in response to the object being a front-opening unified pod (FOUP) for storing the target object to be transferred, the object coordinates are coordinates of a specific point in a face of the object facing the transfer robot.

2. The teaching method of claim 1, wherein the information of the object includes a distance value from the coordinates of the object to the teaching coordinates.

3. The teaching method of claim 2, wherein the distance value includes a distance value of the first direction, a distance value of the second direction, and a distance value of the third direction.

4. The teaching method of claim 1, wherein the first sensor includes a lidar sensor, the second sensor includes a vision sensor, and the third sensor includes a distance sensor.

5. A teaching method for teaching a transfer position of a transfer robot, the teaching method comprising:
    searching for an object on which a target object to be transferred by the transfer robot is placed, based on a three-dimensional (3D) position information acquired by a first sensor; and
    acquiring coordinates of a first direction and coordinates of a second direction of the object based on a data acquired from a second sensor which is a different type from the first sensor,
    wherein the first sensor is a lidar sensor, the second sensor is a vision sensor, and a third sensor is a distance sensor, and
    wherein the method further comprises:
    deriving coordinates of the object based on the 3D position information acquired by the first sensor; and
    checking whether a difference between coordinates of the object derived by the first sensor and coordinates of the first, second and third directions of the object derived by the second sensor and the third sensor exceeds a threshold.

6. The teaching method of claim 1, wherein in response to the object being a support unit on which the target object to be transferred is placed, the object coordinates are coordinates of at least one support pin among support pins of the object.

7. The teaching method of claim 6, wherein the object coordinates include coordinates of a plurality of support pins, and
    the teaching method further comprises calculating the teaching coordinates from a plurality of coordinates of the support pins.

8. A teaching method for teaching a transfer position of a transfer robot, the teaching method comprising:
    searching for an object on which a target object to be transferred by the transfer robot is placed, based on a three-dimensional (3D) position information acquired by a first sensor; and
    acquiring coordinates of a first direction and coordinates of a second direction of the object based on a data acquired from a second sensor, which is a different type from the first sensor,
    deriving coordinates of a third direction of the object, based on a data acquired from a third sensor, which is a different type of sensor from the first sensor and the second sensor,
    calculating teaching coordinates, which are coordinates of the transfer position, based on coordinates of the object including the first direction, coordinates of the second direction and coordinates of the third direction and a pre-stored information of the object
    wherein in response to the object including a chuck on which the target object to be transferred is placed, and a teaching jig placed on the chuck, the object coordinates are coordinates of at least one teaching pin among teaching pins of the teaching jig.

9. The teaching method of claim 8, wherein
    the object coordinates include coordinates of a plurality of teaching pins, and
    the teaching method further comprises calculating the teaching coordinates from a plurality of coordinates of the teaching pins.

10. A non-transitory medium including machine-readable instructions that, when executed by a processor, cause the processor to perform the teaching method of claim 1.

11. The teaching method of claim 1, wherein the information of the object includes a distance value from the coordinates of the object to the teaching coordinates.

* * * * *